(12) United States Patent
Xuan (10) Patent No.: US 9,681,163 B1
(45) Date of Patent: Jun. 13, 2017

(54) IDENTIFY BAD FILES USING QOS DATA

(71) Applicant: Amazon Technologies, Inc., Seattle, WA (US)

(72) Inventor: Jiang Xuan, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/670,290

(22) Filed: Mar. 26, 2015

(51) Int. Cl.
| | |
|---|---|
| *H04N 21/24* | (2011.01) |
| *H04N 21/858* | (2011.01) |
| *H04N 21/643* | (2011.01) |
| *H04N 21/44* | (2011.01) |
| *H04N 21/239* | (2011.01) |
| *H04N 21/6379* | (2011.01) |

(52) U.S. Cl.
CPC ....... *H04N 21/2408* (2013.01); *H04N 21/239* (2013.01); *H04N 21/44008* (2013.01); *H04N 21/6379* (2013.01); *H04N 21/64322* (2013.01); *H04N 21/8586* (2013.01)

(58) Field of Classification Search
CPC ................. H04N 21/20; H04N 21/02; H04N 21/432–21/4335; H04N 2201/3233; H04N 2201/3235; H04N 21/239; H04N 21/44008; H04N 21/6379; H04N 21/64322; H04N 21/8586
USPC ........................................................ 725/116
See application file for complete search history.

(56) References Cited

U.S. PATENT DOCUMENTS

| | | | | |
|---|---|---|---|---|
| 6,172,672 | B1 * | 1/2001 | Ramasubramanian | H04N 7/17336 348/14.14 |
| 7,236,771 | B2 * | 6/2007 | Aaltonen | H04H 20/42 375/E7.025 |
| 7,289,996 | B2 * | 10/2007 | Allhusen | H04L 67/325 |
| 9,071,484 | B1 * | 6/2015 | Truax | H04L 29/06027 |
| 2002/0116452 | A1 * | 8/2002 | Johnson | G06Q 10/10 709/203 |
| 2005/0259947 | A1 * | 11/2005 | Wang | H04L 41/5038 386/203 |
| 2006/0224761 | A1 * | 10/2006 | Howarth | H04N 21/235 709/231 |
| 2007/0271590 | A1 * | 11/2007 | Gulas | H04L 65/4069 725/118 |
| 2008/0037864 | A1 * | 2/2008 | Zhang | H04N 17/004 382/156 |
| 2008/0120404 | A1 * | 5/2008 | Sakai | H04L 41/0681 709/223 |
| 2008/0229371 | A1 * | 9/2008 | Mick | G06F 21/10 725/87 |
| 2010/0250772 | A1 * | 9/2010 | Mao | H04N 21/222 709/231 |
| 2011/0004895 | A1 * | 1/2011 | Ladd | H04N 21/43615 725/31 |
| 2011/0238660 | A1 * | 9/2011 | Riggs | G06F 17/30516 707/726 |
| 2011/0252455 | A1 * | 10/2011 | Riedel | G06F 17/30861 725/115 |

(Continued)

*Primary Examiner* — Nathan Flynn
*Assistant Examiner* — Cynthia Fogg
(74) *Attorney, Agent, or Firm* — Weaver Austin Villeneuve & Sampson LLP (57) ABSTRACT

Methods and apparatus are described for validating files associated with content items. The validation can be performed according to feedback statistics including failure rates pertaining to the content items.

26 Claims, 4 Drawing Sheets

(56) References Cited

U.S. PATENT DOCUMENTS

2013/0024880 A1* 1/2013 Moloney-Egnatios ... H04N 21/4122
                                                         725/14

* cited by examiner

IDENTIFY BAD FILES USING QOS DATA

BACKGROUND

Consumers have an ever-increasing array of options for consuming media content, in terms of the types of media content (e.g., video, audio, etc.), providers of the media content, and devices for consuming the media content. Media content providers are becoming increasingly sophisticated and effective at providing media content quickly and reliably to consumers. Success in the marketplace will depend in part on the ability of media content providers to effectively provide media content to a wide range of devices used by consumers.

To ensure that media content can be reliably provided in response to consumer requests, content providers typically perform validation processes. During the validation processes, the content providers verify the availability and quality of the media content. Unfortunately, due to the vast amount of media content managed by content providers, such validation processes are time-consuming, making it challenging to effectively validate all of the media content.

DETAILED DESCRIPTION

This disclosure describes techniques that provide for efficient validation of media content. More specifically, these techniques use feedback messages received during playback of media content to guide decision making associated with the validation of media content. Such decisions might include, for example, selection and/or prioritization of media content files for which validation is to be performed. As will be appreciated, at least some of the implementations enabled by the present disclosure are advantageous in that they can increase the efficiency with which anomalies in the media content are identified and corrected.

Content providers generally maintain a list of all media content items in their content library. For example, content providers may maintain a list of all video titles in the library, which may include movies and television programs. Consumers may access the library, and select titles from the content library to stream content items to their devices.

Consumers may play content items using various types of devices (e.g., cell phones, laptops, smart televisions, etc.) and models, which have different software and hardware capabilities. More particularly, different devices use a variety of different streaming protocols and have various central processing unit (CPU) capacities and display resolutions. In addition, when consumers connect to networks to playback content items, the available bandwidths can vary across the networks and over time.

To support access to a content item by devices of different device types and models across multiple channels, the content item is typically encoded in different formats compatible with the different protocols at multiple display resolutions and bit rates, resulting in multiple sets of files. For example, the movie "Gone with the Wind" may be encoded into the MPEG-DASH and Microsoft Smooth Streaming formats at resolutions 640×480, 640×360, 1280×720, and 1920×1080 at bit rates 300 kilobits per (kbps), 600 kbps, 1200 kbps, and 2400 kbps. Therefore, the files for a single content item typically include a number of files having various sizes and file characteristics.

Figure 4:
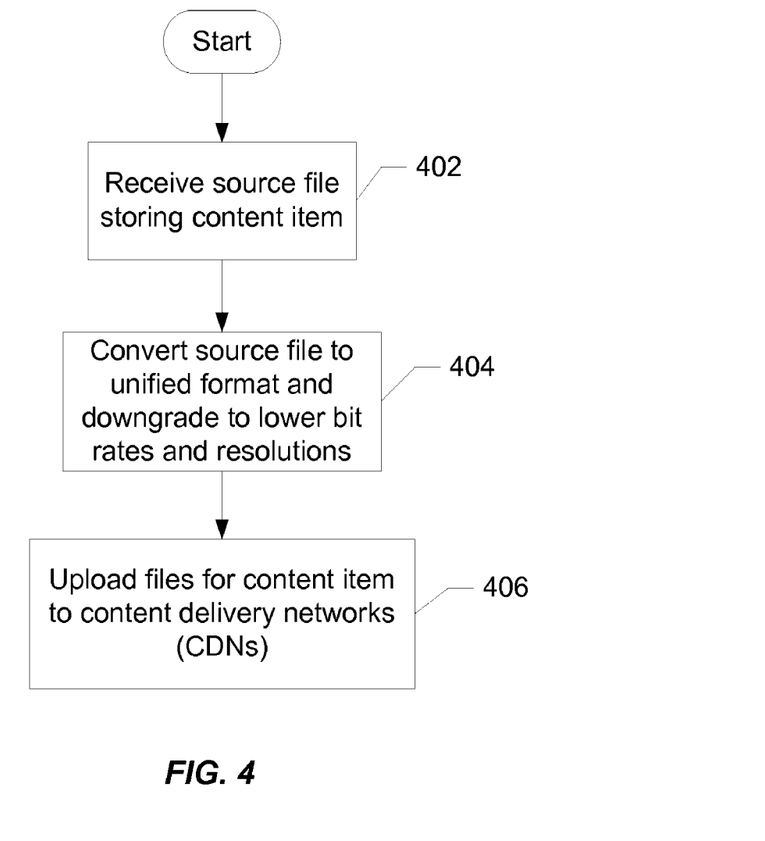
FIG. 4 is a flow diagram illustrating a standard video encoding process.

FIG. 4 is a flow diagram illustrating a standard video encoding process. When a content provider initially receives a source file storing a media content item (402), the content item may be in one of a number of different resolutions (e.g., 4K, high-definition, standard-definition). The content item may be converted to a unified format and downgraded to lower bit rates and resolutions (404). More particularly, for each digital rights management (DRM) platform, the content item may be encoded in various bit rates and resolutions. The files for the content item may then be uploaded to various content delivery networks (CDNs) and stored at any number of servers within each of the CDNs (406). These servers may be referred to as origin servers.

Generally, a client device will request a content item in segments. When a client device tries to access a particular segment of a content item, it will typically communicate with a CDN host server that is closest to the location of the client device. The CDN host will attempt to locate the desired segment in the CDN cache. If the desired segment is in the cache, the client device may access the segment from the cache. However, if the desired segment is not in the cache, the CDN host will look for the desired segment in servers of the CDN. Generally, the CDN host will attempt to find the desired segment in a parent layer before attempting to locate the desired segment at an origin server of the CDN.

Validation of content is generally performed sequentially for titles in a library according to an order that corresponds to the titles of the library. For example, validation of video titles may be performed according to alphabetical order of the titles. As another example, validation may be performed according to the popularity of the titles.

Validation of a content item typically includes validating files across all channels by which the content item is made available to consumers. More particularly, the files for the content item may be distributed to servers of various CDNs. In addition, within a single CDN, copies of the same files may be stored at multiple servers. Therefore, validating a single content item can involve the validation of many files.

Validation may include performing a number of processes to ensure that the content is accessible by consumers and that the quality of the content will meet the expectations of consumers. One way to validate a content item is to download sets of files associated with that content item from servers storing the content item. Once downloaded, a number of checks may be performed. For example, validation may include verifying that the sets of files storing the content item include the same number of files, verifying that the size of files storing the same content and having the same file characteristics is consistent, verifying that file headers are in the appropriate format, and/or verifying encryption keys.

When a content provider downloads files from CDNs, the files are generally downloaded from origin servers of the CDNs. Due to the limitations associated with the speed with which files can be downloaded over the Internet, the downloading of files from origin servers is a particularly slow process. As a result, it would be impractical to validate all titles of a library using this method of validation.

Another way to validate content is to emulate the experience of a client device that might request the content. Generally, a content item will be requested in segments. Thus, validation may include verifying that fragments corresponding to the segments of the content item are served properly to a server emulating the client device.

To emulate the experience of the client, the protocol implemented by the client device is used to communicate with edge servers of the CDNs. Typically, the client's protocol is very fast. However, the frequent access of the CDN cache to validate all of the titles of the library would corrupt the CDN cache and push popular content accessed by consumers from the cache, thereby negatively affecting the experience of the consumers. Therefore, it would be undesirable to access the CDN edge servers to validate all titles of the library.

Upon identifying a problematic file or file inconsistency during the validation process, that file is typically replaced. More particularly, a content provider may replace the file from a master copy maintained by the content provider. Alternatively, where the content provider does not maintain a master copy of the file, the content provider may copy the file from a CDN.

Where the file being replaced has been encoded in accordance with a particular protocol, the problem may have derived from a number of sources. For example, the problem may have originated from the encoding process (e.g., due to a hardware failure of a server performing the encoding process or a problem with the software encoder), corruption of the source media file, a hardware or software failure within a CDN server, a weak network connection, etc. However, the cause of a file inconsistency or anomaly is generally not determined during the validation process. Thus, while an error may have originated from a source other than the encoding process, a source file including the content is typically re-encoded in the pertinent format to generate a replacement for the problematic file. For example, where a file storing the movie "Gone with the Wind" has been encoded in the MPEG-DASH protocol, a source file for the movie is typically re-encoded by an encoder for the MPEG-DASH protocol to generate the replacement file. Therefore, re-encoding is often performed in instances where an anomaly was not introduced during the encoding process As discussed above, each title of a video library is generally maintained in multiple formats compatible with different protocols at various resolutions and bit rates. In addition, the title may be stored in multiple locations, particularly where the title is provided via multiple CDNs. For one title, a set of files associated with a single protocol can include 50 gigabytes (GB). It can take 30 minutes to download a 10 GB file. As a result, it can take several hours to validate a single title. Given the number of titles available in a library, validation of the entire library can take many months. As will be described in further detail below, the validation process may be improved by prioritizing files associated with content items based, at least in part, on messages received from client devices during playback of the content items.

Figure 1:
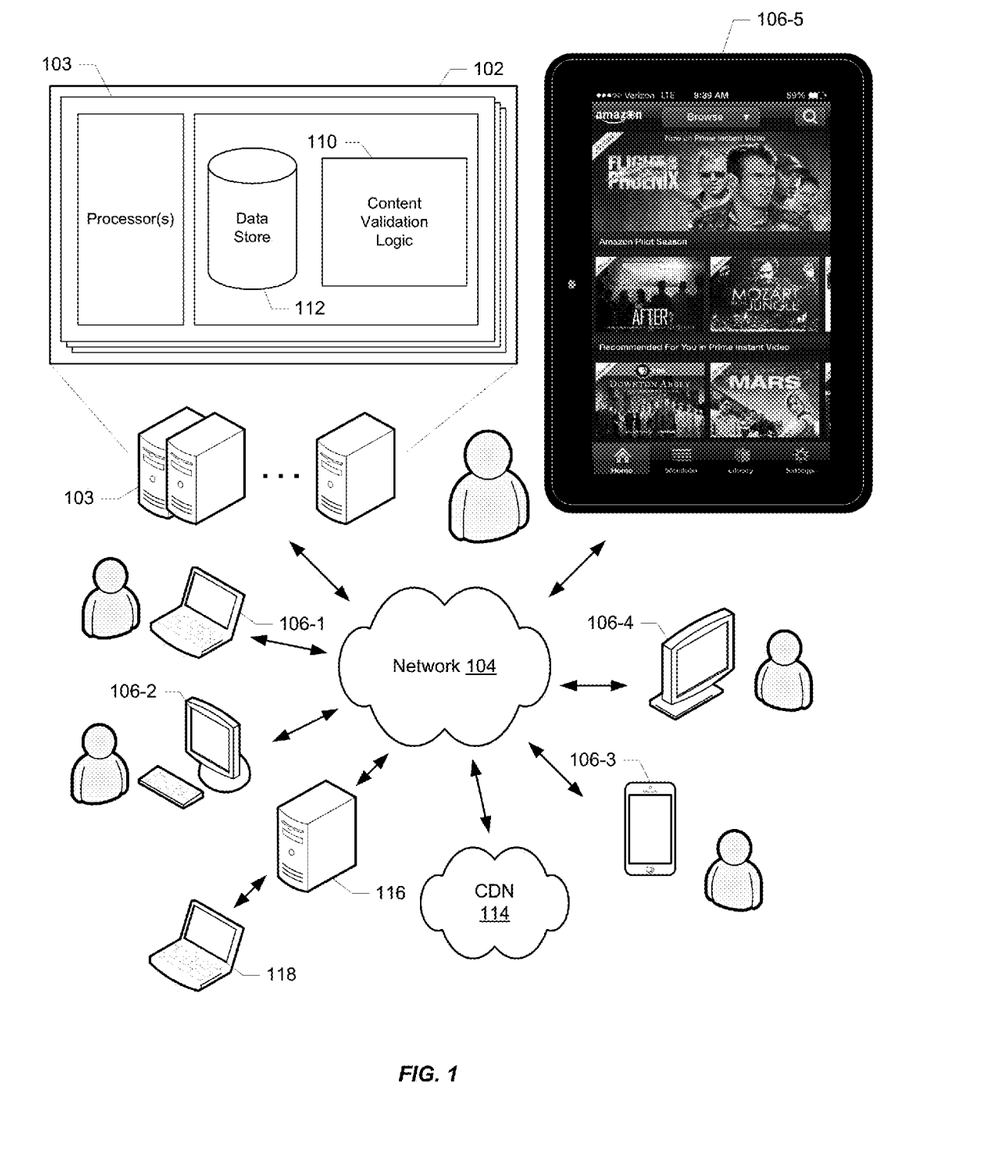
FIG. 1 is a diagram illustrating an example of a network environment in which various implementations may be practiced.

FIG. 1 illustrates an example of a computing environment in which a media content service 102 provides content via network 104 to a variety of client devices (106-1 through 106-5) associated with users in accordance with the techniques described herein. Content service 102 (which may provide video and/or audio content) may conform to any of a wide variety of architectures such as, for example, a services platform deployed at one or more co-locations, each implemented with one or more servers 103. Network 104 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 106 may be any suitable device capable of connecting to network 104 and consuming content provided by service 102. Such devices may include, for example, devices of different types, such as mobile devices (e.g., cell phones, smart phones, and tablets), personal computers (e.g., laptops and desktops), set top boxes (e.g., for cable and satellite systems), smart televisions, gaming consoles, wearable computing devices, etc.

Content service 102 may store content in files having different formats compatible with different protocols, display resolutions, bit rates, etc. For example, content service 102 may maintain video titles of its content library in corresponding source files, which may be encoded to convert the source files to different formats at various resolutions and bit rates. Content service 102 may also maintain encoders for encoding source files according to various protocols, display resolutions, bit rates, etc.

In a particular implementation, the content items are media content items that include video content and/or audio content. Each of media content items may be identified in the content library by a corresponding title. For example, a media content item may be a movie such as "Gone with the Wind" or a television episode such as "Breaking Bad: Season 1, Episode 1."

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 102. Alternatively, such resources may be independent of content service 102, e.g., on a platform under control of a separate provider of computing resources with which content service 102 connects to consume computing resources as needed.

It should also be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples, for the sake of simplicity, content service 102 is described as if it were integrated with the platform(s) that provides the content to client devices. Alternatively, content service 102 may provide access to content in conjunction with one or more content delivery networks (e.g., CDN 114) that may or may not be independent of content service 102. Other variations known to those of skill in the art are contemplated to be within the scope of the invention.

In a specific implementation, the content service 102 supports access to content via multiple CDNs 114. CDN 114 can include one or more servers, which may be deployed at one or more geographic locations (e.g., across different countries, states, cities, etc.). CDN 114 can include a distributed system of servers deployed in multiple data centers across a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

Some of the implementations enabled by the present disclosure are contemplated in which content service 102 includes logic that facilitates at least some aspects of the validation of content as described herein (e.g., content validation logic 110). In one class of implementations, content validation logic 110 may implement or generate a priority schema for use in prioritizing files for validation based, at least in part, on feedback messages received from clients during playback of content. More particularly, feedback messages may indicate whether playback of the content was successful. In addition, content validation logic 110 may perform or initiate various action(s) such as re-encoding a file, initiating replacement of a file, sending a message to an entity associated with content service 102, and/or sending a message to an entity associated with a CDN. Implementations are contemplated in the context of streaming and downloading media content.

Content service 102 may also include user account information (e.g., in data store 112) as well as business logic (not shown) that governs the operation of the service and management of user accounts. According to some implementations, data store 112 may also include the content (including associated manifest files and/or file metadata) to which service 102 provides access. Alternatively, content may be provided and/or hosted by one or more separate platforms, e.g., CDN 114. It should be noted that, while content validation logic 110 and data store 112 are contemplated as integrated with content service 102, implementations are contemplated in which either or both operate remotely from the associated content service, and/or either or both are under the control of an independent entity.

The computing environment of FIG. 1 may also include a platform (e.g., represented by server 116 and laptop 118) by which decisions may be made using client feedback messages or in response to other messages that are transmitted, as described herein. Such a platform may be integrated with or under control of an entity associated with content service 102. Alternatively, such a platform may be provided as a third-party service.

Figure 2:
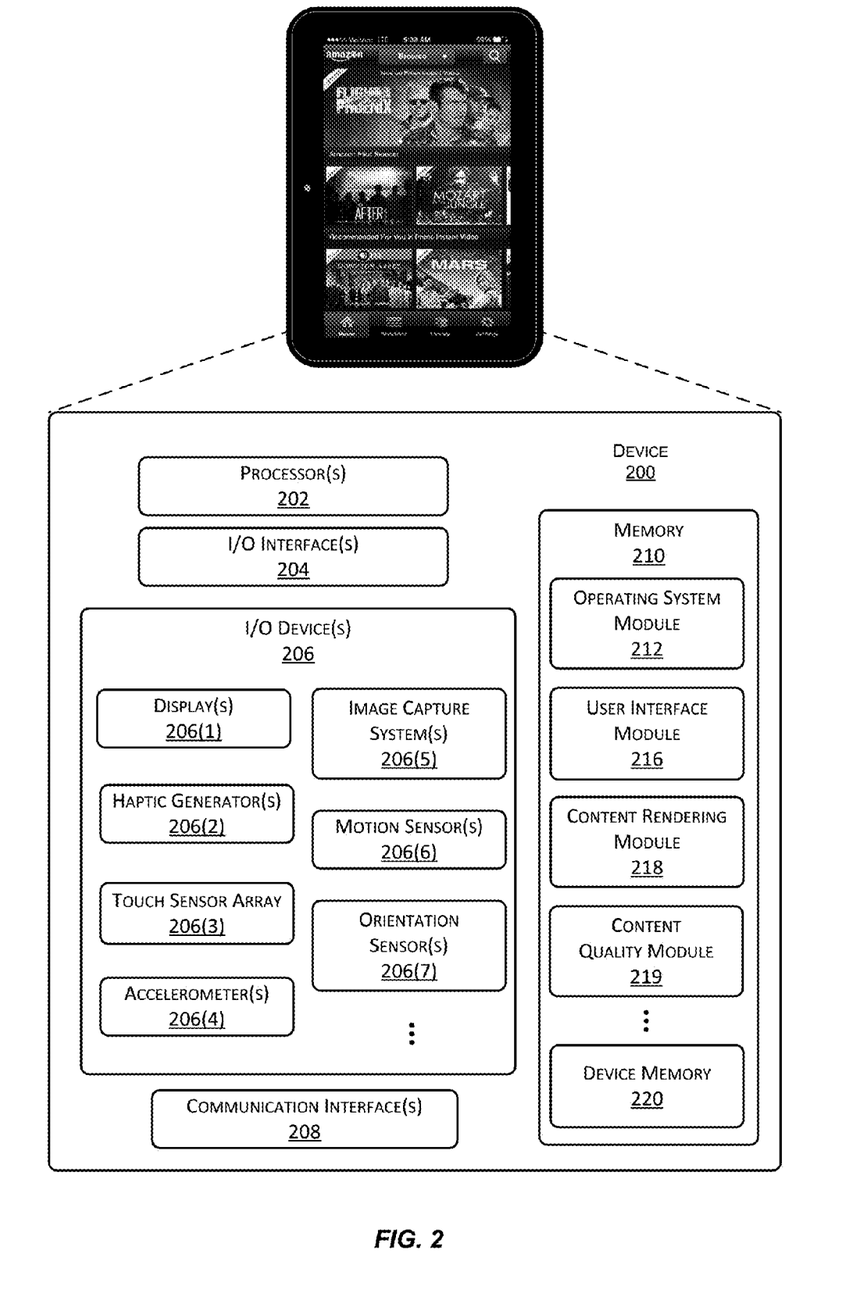
FIG. 2 is a simplified block diagram illustrating an electronic device that may be employed with various implementations.

A block diagram of an example of a client device 200 suitable for use with various implementations is shown in FIG. 2. Device 200 includes one or more single or multi-core processors 202 configured to execute stored instructions (e.g., in device memory 220). Device 200 may also include one or more input/output (I/O) interface(s) 204 to allow the device to communicate with other devices. I/O interfaces 204 may include, for example, an inter-integrated circuit (I2C) interface, a serial peripheral interface (SPI) bus, a universal serial bus (USB), an RS-232 interface, a media device interface, and so forth. I/O interface(s) 204 is coupled to one or more I/O devices 206. The I/O device(s) 206 may include one or more displays 206(1), one or more haptic generators 206(2), a touch sensor array 206(3), one or more accelerometers 206(4), one or more image capture systems 206(5), one or more motion sensors 206(6), one or more orientation sensors 206(7), microphones, speakers, and so forth. The one or more displays 206(1) are configured to provide visual output to the user and may comprise any of a variety of display types including, for example, any type of reflective or transmissive display. Touch sensor array 206(3) may be a capacitive sensor array having a matrix of conductors that are scanned to determine, for example, the location, duration, speed and direction of touch events within the matrix based on changes in electrical capacitance.

Device 200 may also include one or more communication interfaces 208 configured to provide communications between the device and other devices. Such communication interface(s) 208 may be used to connect to cellular networks, personal area networks (PANs), local area networks (LANs), wide area networks (WANs), and so forth. For example, communications interfaces 208 may include radio frequency modules for a 3G or 4G cellular network, a WiFi LAN and a Bluetooth PAN. Device 200 also includes one or more buses or other internal communications hardware or software that allow for the transfer of data and instructions between the various modules and components of the device.

Device 200 also includes one or more memories (e.g., memory 210). Memory 210 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 210 provides storage for computer readable instructions, data structures, program modules and other data for the operation of device 200. Memory 210 includes at least one operating system (OS) module 212 configured to manage hardware resources such as I/O interfaces 204 and provide various services to applications or modules executing on processor(s) 202. Memory 210 also includes a user interface module 216, a content rendering module 218, and other modules.

Memory 210 also includes device memory 220 to store a wide variety of instructions and information using any of a variety of formats including, for example, flat files, databases, linked lists, trees, or other data structures. Such information includes content for rendering and displaying on display 206(1) including, for example, any type of video content. In some implementations, a portion of device memory 220 may be distributed across one or more other devices including servers, network attached storage devices, and so forth.

Device 200 may be configured to generate and transmit feedback to content service 102 in association with a content item that has been requested from the content service 102. In accordance with various implementations, feedback may be generated and transmitted to content service 102 during playback of the content item. The feedback may indicate the quality of the service experienced by device 200 during playback of the content item. More particularly, the feedback may indicate whether playback of the corresponding content item during a corresponding session is successful. For example, the feedback may indicate that streaming of a content item during a corresponding session is smooth. As another example, the feedback may indicate that a file associated with the content item cannot be downloaded. In accordance with some implementations, where device 200 is downloading the content item rather than streaming the content item, feedback may also be generated and transmitted to content service 102 by device 200 during or after downloading the content item. Such feedback may pertain to the success of the downloading process and/or the subsequent playback of the downloaded content item.

Device 200 may generate and transmit feedback to content service 102 in the form of quality of service (QoS) event messages. In accordance with various implementations, a QoS event message may include an event type that identifies the type of event for which the event message is transmitted. For example, an event type may correspond to obtaining a digital rights management (DRM) license for the content item, downloading the content item, streaming the content item, or buffering the content item. Where an error occurs during playback of the content item, the event message may indicate the type of error that occurred. For example, the event message may include an error code corresponding to the type of error that occurred during playback of the content item. Thus, an event message may indicate whether a failure occurred during playback of a content item and, in the event of a failure, the type of event associated with the failure.

In a particular implementation, a QoS event message further includes a user identifier (e.g., device identifier and/or customer identifier), session identifier, device type, Internet Service Provider (ISP), timestamp, Uniform Resource Locator (URL) that identifies a source of the content item that is accessed by device 200, and signal strength. In addition, a QoS event message may include further information pertaining to device 200 such as the model of the device type, browser, and/or operating system of device 200. A QoS event message may also include additional information pertaining to the session, such as a geographic location of device 200.

The logic or computer program instructions used to support the generation and transmission QoS event messages (represented by feedback module 219) may be implemented in a variety of ways. For example, at least some of this functionality may be implemented as part of the code of a media player operating on device 200. Alternatively, feedback module 219 may be implemented separately from the device's media player. And as mentioned above, implementations are contemplated in which at least a portion of the logic or computer program instructions may reside on a separate platform, e.g., service 102, CDN 114, etc. Suitable variations and alternatives will be apparent to those of skill in the art. It will also be understood that device 200 of FIG. 2 is merely an example of a device with which various implementations of the present invention may be practiced, and that a wide variety of other devices types may also be used (e.g., devices 106-1 to 106-5). The scope of the invention should therefore not be limited by reference to device-specific details.

Figure 3:
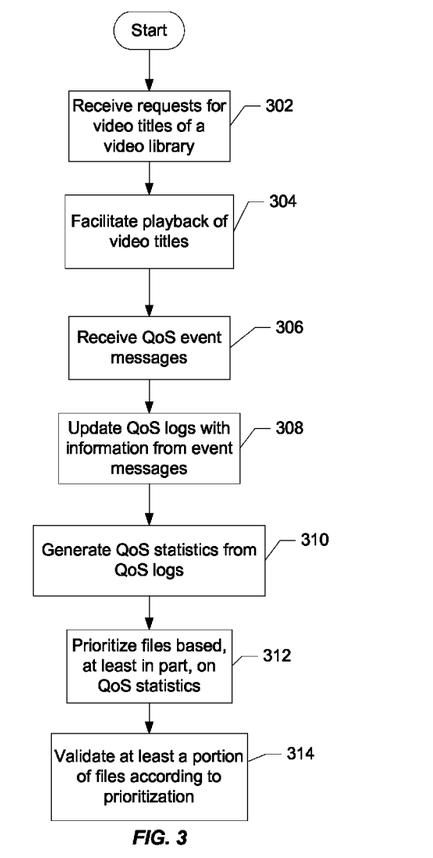
FIG. 3 is a flow diagram illustrating operation of a particular implementation.

A process of performing validation of content according to one implementation is illustrated in the flow chart of FIG. 3. Content service 102 receives requests for playback of video titles of a video library from a plurality of client devices (302). More particularly, when a user selects a video title (e.g., in the user interface of the client), a request for that content is received by the client. The client connects with a remote video content service, e.g., content service 102 of FIG. 1, and requests the manifest file for the selected title.

In response to the requests received from the client devices, content service 102 facilitates playback of the video titles by the client devices (304). Specifically, content service 102 provides the manifest file to each requesting client device in response to its request for a video title. The manifest file includes information relating to the requested content that allows a client device to generate properly formatted requests for specific fragments of the content. For a particular segment of the content, the manifest file will typically identify a number of different options for fragments that may be requested for playback of that segment. The fragments for a given content segment may be of different sizes, for different streaming protocols, for different display resolutions, for different bit rates, etc. The client then proceeds to select fragments for each segment of the content for playback in real time.

Content service (102) receives Quality of Service (QoS) event messages from the client devices during playback of the video titles, where each of the QoS event messages represents a playback event occurring during playback of a corresponding video title by a corresponding client during a corresponding session (306). During a session, a client device may send one or more QoS event messages. QoS event messages may represent positive or negative playback events occurring during playback of a corresponding video title. For example, a playback event can include successful streaming via a particular URL, failure during streaming via a particular URL, or an inability to access a particular URL.

As QoS event messages are received by content service 102, content service 102 updates QoS logs with information from the QoS event messages, where each of the QoS logs aggregates the information from the QoS messages for the corresponding session (308). The information recorded in the QoS logs may indicate, for each session, whether playback of the corresponding video title was successful. Similarly, for downloading scenarios, the QoS logs may indicate whether downloading of the corresponding video title was successful and/or whether playback of the corresponding video title was successful after downloading of the video title.

Each QoS log may be stored in association with a particular user (e.g., client device and/or customer identifier). In accordance with various implementations, the event logs may be stored such that the sessions are associated with the corresponding client devices. For example, a QoS log may be stored in association with device information such as device type, device model, browser, and/or operating system. In this manner, each session may be associated with the device information (e.g., device type) for the corresponding client device. In addition, a QoS log may be stored in association with additional session information such as geographic location and/or ISP.

The QoS logs may record events that occur during each corresponding session. More particularly, a QoS log may include, for each corresponding event, a timestamp, event type, and URL accessed during the corresponding event. Where an error has occurred during playback, the QoS log may record the occurrence of the error. In addition, the QoS log may indicate the type of error that occurred during the corresponding session. For example, the type of error may be identified via an event type and/or error code.

Content service 102 may determine whether playback of a video title during a corresponding session is successful based, at least in part, on the information recorded in the QoS logs. For example, content service 102 may determine whether playback of the video title is successful based, at least in part, on event types and/or error codes of event messages received during playback. In some implementations, playback of the video title may be deemed to be successful in the event that an error is not communicated by the client during playback. In other implementations, playback of the video title may be deemed to be successful in the event that a "fatal error" does not occur during playback. For example, the occurrence of a fatal error may be defined by a specific set of event types and/or error codes. Thus, failure during playback of a video title may be identified based, at least in part, on the number of errors that are communicated by the client device during playback, the type of errors that are communicated by the client device during playback, and/or the events with which an error is associated.

Content service 102 generates QoS statistics from the QoS logs, where the QoS statistics represent one or more playback failure rates for each of the video titles (310). For example, a failure rate may pertain to a particular Internet Protocol (IP) address, geographic location, protocol, URL, CDN, CDN host, server, device type, device model, and/or period of time. Each failure rate may indicate the percentage of sessions during which a failure occurred. More particularly, a failure rate may be determined based upon a number of sessions during which a failure occurred during playback (e.g., for a geographic location, protocol, URL, CDN, CDN host, server, device type, device model, and/or period of time) with respect to a total number of sessions during which playback occurred (e.g., for a geographic location, protocol, URL, CDN, CDN host, server, device type, device model, and/or period of time). For example, a failure rate may be determined based upon the number of sessions during which a failure occurred during playback of a particular file with respect to the number of sessions during which playback of the particular file occurred. In one implementation, content service 102 generates a matrix including the QoS statistics for efficient retrieval and analysis of the QoS statistics by content service 102.

QoS statistics may be generated periodically. For example, the QoS statistics may be generated at particular time intervals that have been statically configured. As another example, the QoS statistics may be generated at time intervals that vary with the time of day, week, and/or year. As yet another example, the QoS statistics may be generated after a particular number of requests or QoS event messages have been received by content service 102. In a particular implementation, a matrix is updated periodically with the most recent playback statistics.

Content service 102 prioritizes files corresponding to the video titles for validation based, at least in part, on the QoS statistics (312). In accordance with some implementations, files for which playback failure rates or an increase in failure rates is high may be given high priority, while files for which playback failure rates or the increase in failure rates is low may be given low priority. Thus, files may be prioritized according to their failure rates or increase in failure rates. In accordance with other implementations, prioritization may include comparing the playback failure rates or an increase in the playback failure rates over a period of time to corresponding threshold values. More particularly, files may be prioritized based upon the difference between the playback failure rates or increase in failure rates and corresponding threshold values. Threshold values may be established in association with geographic locations, protocols, Internet Protocol (IP) addresses, device types, device models, CDNs, CDN hosts, URLs, specific video titles, categories of video titles, and/or time periods. For example, by establishing a lower threshold value for one category of video titles over another, it is possible to prioritize that category during the validation process.

Content service 102 may prioritize files according to a priority schema determined, at least in part, with reference to the QoS statistics. For example, the priority schema may prioritize files or video titles associated therewith based, at least in part, on corresponding failure rates. The priority schema may be determined periodically according to the most recent QoS statistics. In some implementations, the priority schema may be determined in response to the updating of the QoS statistics. In other implementations, the priority schema may be determined after a lapse of a particular period of time. In yet other implementations, the priority schema may be determined after completion of validation by content service 102 of previously identified file(s).

The QoS statistics may indicate the number of people watching each of the video titles. For example, the QoS statistics may indicate the number of requests received by content service 102 from the client devices for each of the video titles. Thus, from the QoS statistics, it is possible to ascertain the video titles that are watched, as well as the popularity of the various video titles. Therefore, the files may be prioritized based, at least in part, on the popularity of video titles in a content library (e.g., according to requests for the video titles received by the content service 102).

Similarly, the QoS statistics may also indicate the popularity of specific files. More particularly, content service 102 of FIG. 1 may determine from the QoS logs the number of sessions during which playback occurred for various URLs. For example, a first file storing the television episode "Breaking Bad: Season 1, Episode 1" at a server within a first CDN may be identified in 30 sessions within the event logs, while a second file storing the same television episode at a server within a second CDN may be identified in 10,000 sessions within the event logs. Even if the failure rate associated with the first file is 30 percent and the failure rate associated with the second file is 10 percent, the failures associated with the second file effect more client devices than those associated with the first file. In this instance, content service 102 may assign the second file a higher validation priority than the first file. In this manner, files may be prioritized based, at least in part, on the number of sessions during which playback of the files occurred.

As described above, video titles or specific files may be prioritized according to their popularity. Where video titles or specific files are not watched or watched infrequently, their validation will have less impact on consumers. Therefore, in instances where video titles are unpopular or specific files are infrequently accessed, the video titles or files (e.g., URLs) may be assigned a low validation priority or may be excluded entirely from the validation process.

In addition, content providers often maintain video titles in the library that are not yet released for consumer viewing. Typically, content providers advertise the date and time that the unreleased video titles will be available from the library. As a result, when video titles are recently released, the video titles tend to be popular among viewers. Thus, in some implementations, a prediction mechanism may predict the popularity of unreleased or recently released video titles. Such a prediction mechanism may consider the availability of the titles (e.g. the time until an unreleased video title is made available for viewing or the amount of time that has lapsed since the release of a video title) to predict the popularity of various titles. In addition, the prediction mechanism may use publicly available statistics to predict the popularity of video titles. For example, publicly available statistics may indicate the number of sales of physical media (e.g., digital video discs (DVDs)) storing the video titles, the number of sales of electronic copies of the video titles, and/or the number of ticket sales in movie theaters for the video titles. Thus, in some implementations, it may be desirable to prioritize validation of various unreleased or recently released titles in anticipation of the impending popularity of those titles. In these instances, validation of unreleased titles may be performed after or before the release of the titles.

Content service 102 may determine the priority schema by employing various heuristics (e.g., rules), which may correlate various playback statistics and/or other information collected during playback with problems that are known to occur periodically. Such problems may include, but are not limited to, specific device types, device models, protocols, CDNs, CDN hosts, URLs, servers, and/or time periods. For example, the priority schema may indicate whether playback failures associated with a particular video title are limited to a specific device type, protocol, device model, and/or URL. As a result, content service 102 may validate specific file(s) associated with a particular video title without validating all files associated with the video title.

Content service 102 may apply rules that identify instances in which it will not perform validation, as well as instances in which it will perform validation. More particularly, instances in which content service 102 will not perform validation may include, but are not limited to, a problem originating within a CDN or a weak signal. For example, content service 102 may ascertain that playback failures associated with a video title pertain to a problem originating within a particular CDN or a particular server, and determine that it will not validate corresponding files. As another example, content service 102 may ascertain that playback failures associated with a video title are limited to a particular time period and that the playback failures occurred due to a transient problem that is unrelated to the integrity of the corresponding file(s).

In some implementations, the priority schema may be determined (e.g., generated or updated), at least in part, using machine learning techniques. More particularly, machine learning techniques may be employed to identify correlations between playback statistics and various problems that are known to occur.

In some implementations, the prioritization of the files may specify a particular order in which the files are to be validated. In other implementations, the prioritization may be performed dynamically. For example, a priority schema may be applied dynamically to select the next file to be validated without assigning a particular order to the files.

Content service 102 validates at least a portion of the files according to the prioritization of the files (314). Since validation is performed according to a priority derived from information obtained during playback of the video titles, those files for which significant failures occurred during playback may be prioritized during the validation process. Similarly, where failures did not occur during playback of a video title, content service 102 may assign a lower priority to the file(s) accessed during playback of the video title or, alternatively, may choose not to validate the corresponding file(s). In this manner, it is possible to reduce the number of files that are validated, thereby increasing the efficiency of the validation process.

Although the implementation of FIG. 3 is described with reference to video titles, the disclosed implementations may also be employed with other types of content items, such as images or audio files. In addition, while the statistics are described as representing failure rates, other types of statistics may also be generated and used to prioritize files. Implementations are also contemplated in which various statistics pertain to downloading of video titles rather than streaming of video titles. Moreover, while the QoS logs are described as aggregating events for each session, content service 102 may also maintain event logs that record events communicated by clients during playback of content items such that the logs are organized or indexed by various parameters such as IP address, geographic location, URL, protocol, device type, and/or device model, in addition to or instead of a session identifier.

In accordance with various implementations, where the playback statistics indicate a low probability that a file is corrupted or otherwise problematic, content service 102 will not validate that file. As a result, the files that are validated may include a fraction of all files associated with a content library of content service 102. Similarly, content service 102 may not perform validation in association with various content items in its content library. More particularly, since the content items for which QoS event messages are received and playback statistics are generated may represent a subset of the content items of the content library, content service 102 may not validate files associated with those content items that have not been played by consumers. For example, unreleased video titles may be excluded from the validation process since the event logs will not identify these video titles as having been watched by consumers. In this manner, it is possible for content service 102 to dramatically reduce the time it takes to validate the relevant portion of its content library.

Through the application of playback statistics, content service 102 may identify those files for which significant playback anomalies have occurred. In some implementations, the priority schema may prioritize these files for validation. However, in some instances, the cause of playback failure during playback of a content item may be independent from the integrity of the corresponding file. For example, playback failure may occur as a result of a hardware or software failure within a CDN. In such instances, it may be beneficial to identify the corresponding file as one for which validation is not to be performed or, alternatively, assign a lower validation priority to the file.

Where an inconsistency between files storing the same content is recognized during the validation process, each of the files is typically replaced. However, in accordance with various implementations, content service 102 may validate files according to a priority schema determined, at least in part, on associated playback statistics. Thus, content service 102 may validate one file by which the content is accessible (e.g., via a first URL) without validating another file by which the content is accessible (e.g., via a second URL). As a result, replacement of files may be performed on a per-file basis. More particularly, content service 102 may initiate replacement of a file stored at a server associated with a particular URL via which the content item is accessible without initiating replacement of other files via which the content item is accessible. For example, a file compatible with one protocol may be replaced without initiating replacement of file(s) compatible with another protocol.

In some instances, content service 102 may initiate replacement of a file without validating the file. In accordance with various implementations, content service 102 may ascertain based, at least in part, on the playback statistics, whether an error was introduced during the encoding process by an encoder. For example, where files encoded in the same format are stored at multiple servers and content service 102 ascertains that playback failures primarily occurred during playback from a particular server, content service 102 may determine that an error was not introduced during the encoding of the files. In such situations, content service 102 may conclude that a file was corrupted during the file distribution process (e.g., via a CDN or particular server associated with the CDN). Therefore, content service may initiate replacement of the file without validating the file or re-encoding a source file to generate a replacement file.

In accordance with various implementations, content service 102 may ascertain a probable cause of failure during playback of the content item. Content service 102 may determine the appropriate action based, at least in part, on the probable cause of failure. Thus, content service 102 may determine whether to validate the file and/or perform some other action other than validation of the file. These actions can include, but are not limited to, initiating replacement of a file, sending a message to an entity associated with content service 102, and/or sending message to an entity associated with a CDN.

Where content service 102 ascertains that the probable cause of failure during playback of one of the content items originates in a CDN, content service 102 may transmit a message to an entity associated with the CDN. In some instances, content service 102 may ascertain that a failure originates from a specific server within the CDN. Thus, the message that is transmitted may identify the specific server within the CDN and/or may be transmitted to the specific server.

Content service 102 may be unable to determine a probable cause of failure during playback of one of the content items. In such instances, a message may be transmitted to an entity associated with content service 102. For example, the message may be transmitted via electronic mail to one or more individuals. The message may include playback statistics, information from event logs, and/or device information such as device type and/or device model. The cause of playback failure during playback of the content item may then be further investigated. Upon identification of the cause of playback failure, rules and/or machine learning techniques employed by content service 102 may be updated.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer program product, comprising one or more non-transitory computer-readable media having computer program instructions stored therein, the computer program instructions being configured such that, when executed by one or more computing devices, the computer program instructions cause the one or more computing devices to:
   receive requests for playback of a plurality of video titles of a video library from a plurality of client devices;
   facilitate playback of the video titles of the video library by the client devices via files corresponding to the video titles, the files including a plurality of files associated with the same one of the video titles;
   receive Quality of Service (QoS) event messages from the client devices during playback of the video titles of the video library, each of the QoS event messages representing a playback event occurring during playback of a corresponding video title by a corresponding client during a corresponding session;
   update QoS logs with information from the QoS event messages;
   generate QoS statistics from the QoS logs, the QoS statistics representing one or more playback failure rates for each of the video titles;
   prioritize the files corresponding to the video titles based, at least in part, on the QoS statistics representing one or more playback failure rates for each of the video titles; and
   validate at least a portion of the files according to the prioritization of the files to verify integrity of the portion of the files.

2. The computer program product of claim 1, wherein at least one of the QoS statistics pertains to one or more of:
   an Internet Protocol (IP) address;
   a geographic location;
   a protocol;
   a device type;
   a device model;
   a Content Delivery Network (CDN);
   a Uniform Resource Locator (URL);
   a server;
   a CDN host; or
   a period of time.

3. The computer program product of claim 1, wherein the files provide access to the video titles by client devices of a plurality of device types via a plurality of Content Delivery Networks (CDNs).

4. The computer program product of claim 1, wherein prioritizing files corresponding to the video titles for validation based, at least in part, on the QoS statistics comprises:
   prioritizing the video titles.

5. A computer-implemented method, comprising:
   maintaining event logs representing playback events occurring during playback of a plurality of content items by a plurality of client devices, each of the plurality of content items corresponding to a different one of a plurality of titles of a content library;
   generating playback statistics for each of the plurality of content items with reference to the event logs;
   determining a priority schema with reference to the playback statistics for each of the plurality of content items; and
   validating at least a portion of files associated with the plurality of content items according to the priority schema to verify integrity of the portion of the files, wherein the files include a plurality of files associated with the same one of the plurality of content items.

6. The method of claim 5, wherein the playback statistics include playback failure rates pertaining to one or more of:
   an Internet Protocol (IP) address;
   a geographic location;
   a protocol;
   a device type;
   a device model;
   a Content Delivery Network (CDN);
   a Uniform Resource Locator (URL);
   a server;
   a CDN host; or
   a period of time.

7. The method of claim 5, further comprising:
   determining the priority schema based, at least in part, upon threshold values associated with one or more of:
   a geographic location, a protocol, an Internet Protocol (IP) address, a device type, a device model, a Content Delivery Network (CDN), a CDN host, a Uniform Resource Locator (URL), one of the plurality of media content items, a category of media content items, or a period of time.

8. The method of claim 5, wherein validating at least a portion of files associated with the content items comprises:
validating a first one of the plurality of files without validating a second one of the plurality of files.

9. The method of claim 5, wherein a first one of the plurality of files conforms to a first format compatible with a first protocol and a second one of the plurality of files conforms to a second format compatible with a second protocol.

10. The method of claim 5, further comprising:
initiating replacement of a file stored at a server associated with a particular Uniform Resource Locator (URL) with a replacement file without validating the file stored at the server.

11. The method of claim 5, further comprising:
initiating replacement of a file stored at a server associated with a particular Uniform Resource Locator (URL) with a replacement file without performing re-encoding to generate the replacement file.

12. The method of claim 5, further comprising:
initiating replacement of a first one of the plurality of files without initiating replacement of a second one of the plurality of files.

13. The method of claim 5, wherein determining a priority schema with reference to the playback statistics for each of the plurality of content items comprises:
determining the priority schema, at least in part, on a popularity of the titles of the content library or files associated therewith, a predicted popularity of the titles of the content library, availability of the titles of the content library, number of sales of physical or electronic media storing the titles, or number of ticket sales in theaters for the titles.

14. The method of claim 5, wherein validating at least a portion of files associated with the plurality of content items comprises:
downloading sets of files associated with one of the plurality of content items to verify integrity of the sets of files.

15. The method of claim 5, wherein the priority schema indicates a priority among the content items.

16. The method of claim 5, wherein the plurality of files are stored among a plurality of servers.

17. The method of claim 5, wherein the playback statistics represent one or more playback failure rates for each of the content items.

18. A device, comprising:
memory;
a network interface; and
one or more processors configured to:
maintain event logs representing playback events occurring during playback of a plurality of content items by a plurality of client devices, each of the plurality of content items corresponding to a different one of a plurality of titles of a content library;
generate playback statistics for each of the plurality of content items with reference to the event logs;
determine a priority schema with reference to the playback statistics for each of the plurality of content items; and
validate at least a portion of files associated with the plurality of content items according to the priority schema to verify integrity of the portion of the files, wherein the files include a plurality of files associated with the same one of the plurality of content items.

19. The device of claim 18, wherein the playback statistics include playback failure rates pertaining to one or more of:
an Internet Protocol (IP) address;
a geographic location;
a protocol;
a device type;
a device model;
a Content Delivery Network (CDN);
a Uniform Resource Locator (URL);
a CDN host;
a server; or
a period of time.

20. The device of claim 18, wherein the one or more processors are further configured to:
determine the priority schema based, at least in part, upon threshold values associated with one or more of: a geographic location, a protocol, an Internet Protocol (IP) address, a device type, a device model, a Content Delivery Network (CDN), a CDN host, a Uniform Resource Locator (URL), one of the plurality of media content items, a category of media content items, or a period of time.

21. The device of claim 18, wherein validating at least a portion of files associated with the plurality of content items comprises:
validating a first one of the plurality of files without validating a second one of the plurality of files.

22. The device of claim 18, wherein a first one of the plurality of files conforms to a first format compatible with a first protocol and a second one of the plurality of files conforms to a second format compatible with a second protocol.

23. The device of claim 18, wherein the one or more processors are further configured to:
initiate replacement of a file stored at a server associated with a particular Uniform Resource Locator (URL) with a replacement file without validating the file stored at the server.

24. The device of claim 18, wherein the one or more processors are further configured to:
initiate replacement of a file stored at a server associated with a particular Uniform Resource Locator (URL) with a replacement file without performing re-encoding to generate the replacement file.

25. The device of claim 18, wherein the one or more processors are further configured to:
initiate replacement of a first one of the plurality of files without initiating replacement of a second one of the plurality of files.

26. The device of claim 18, wherein the one or more processors are further configured to:
determine the priority schema, at least in part, on a popularity of the titles of the content library or files associated therewith, a predicted popularity of the titles of the content library, availability of the titles of the content library, number of sales of physical or electronic media storing the titles, or number of ticket sales in theaters for the titles.

* * * * *